July 11, 1933.  A. L. SEARLES  1,917,857
DUST COLLECTOR
Filed March 9, 1931  2 Sheets-Sheet 2
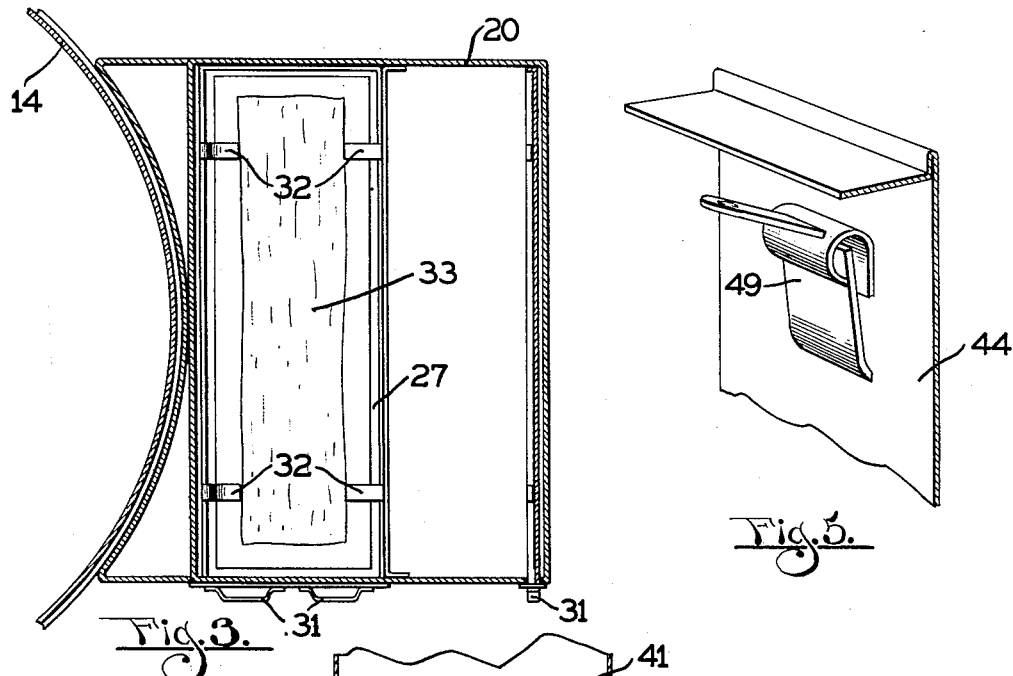
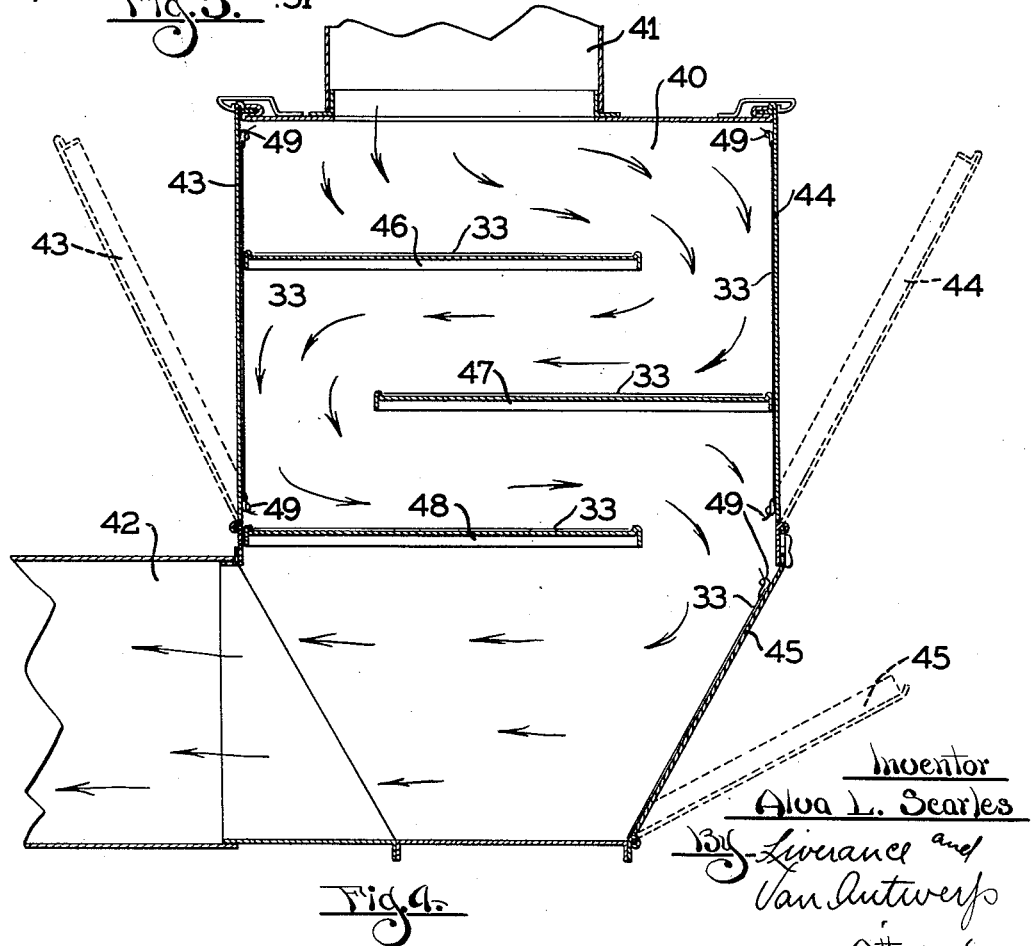

Patented July 11, 1933

1,917,857

UNITED STATES PATENT OFFICE

ALVA L. SEARLES, OF GRAND RAPIDS, MICHIGAN

DUST COLLECTOR

Application filed March 9, 1931. Serial No. 521,147.

This invention relates generally to dust collectors and more particularly to a sheet of material having an adhesive substance thereon, this substance being adapted to receive the particles of dust and dirt out of an air stream which impinges thereagainst.

My dust collector is particularly desirable for use in the air stream of a heating system although it is not limited to such a particular function but may be utilized wherever desired.

One defect of devices of this character which are now used is that they materially hinder the free passage of air through the duct or passageway in which they are placed and it is a primary object of my invention to eliminate this objectionable feature. Furthermore, previously manufactured dust collecting devices usually become clogged up after a period of use with the result that the passage of the air therethrough becomes increasingly difficult.

One of the principal objects of my invention is to overcome the two difficulties just set forth. These difficulties are overcome by the use of my novel adhesive dust collecting means which remove the dust and dirt from the air by merely the passage of the air therealong and hence the air flows thereby without material friction and furthermore the passage of the air is independent of the amount of dust or dirt which is gathered upon the said adhesive dust collecting surfaces. In other words, the air does not pass through the adhesive dust collecting means but merely passes therealong and hence the accumulation of dirt upon the adhesive surface does not change the force necessary to cause the air to flow along its duct or passageway.

As will be obvious from a cursory inspection of the drawings in the instant case the air is forced to change its direction of motion several times during its passage through the collecting chamber and the heavier particles of dust and dirt tend to travel in a straight line thus impinging themselves up the several adhesive surfaces.

Due to the fact that I utilize an adhesive mixture which does not flow at the higher temperatures, I am able to position my novel dust collecting means both in horizontal and vertical positions as desired. As a matter of fact, they may even be utilized in inverted position.

Hence I am able to make the dust collecting chamber of relatively small size and yet obtain a high efficiency as regards the removing of dust, dirt, bacteria, and the like from the air which passes therethrough.

Another feature of my invention resides in the novel mounting means for the adhesive piece of material whereby they may be readily removed and replaced whenever such is deemed necessary.

Still another advantage of my invention resides in the fact that I form the adhesive mixture from a combustible material which has a relatively high flash point, thus allowing it to operate upon air which may be at a considerable temperature. However, the viscous coating, which may be composed of a mixture of oil and gums, is readily inflammable at the higher temperatures and hence the same may be burned.

Thus the material may be readily disposed of by burning in the furnace. The adhesive mixture or viscous coating is of such constituency as to remain without flowing upon its face up to a temperature of about 150° F. Hence, as this temperature is considerably above that of the incoming air of the ordinary furnace circulation, the adhesive sheet may be placed in any position desired. That is, it may be placed either at an angle or on the horizontal.

The further objects and advantages will be obvious to one skilled in the art without further description.

In the drawings:—

Fig. 3 is a horizontal sectional view taken along the plane of the line 3—3 of Fig. 1 and looking as indicated by the arrow.

Fig. 4 is a view in cross section illustrating a modified form of cleaning and collecting chamber, the dotted line illustrating the position of the several doors when they are swung to their outer position whereby the renewal of the adhesive sheets may be readily accomplished.

Fig. 5 is an enlarged perspective view of one of the clips used in Fig. 4.

Similar numerals refer to similar parts throughout the several views.

Figure 1:
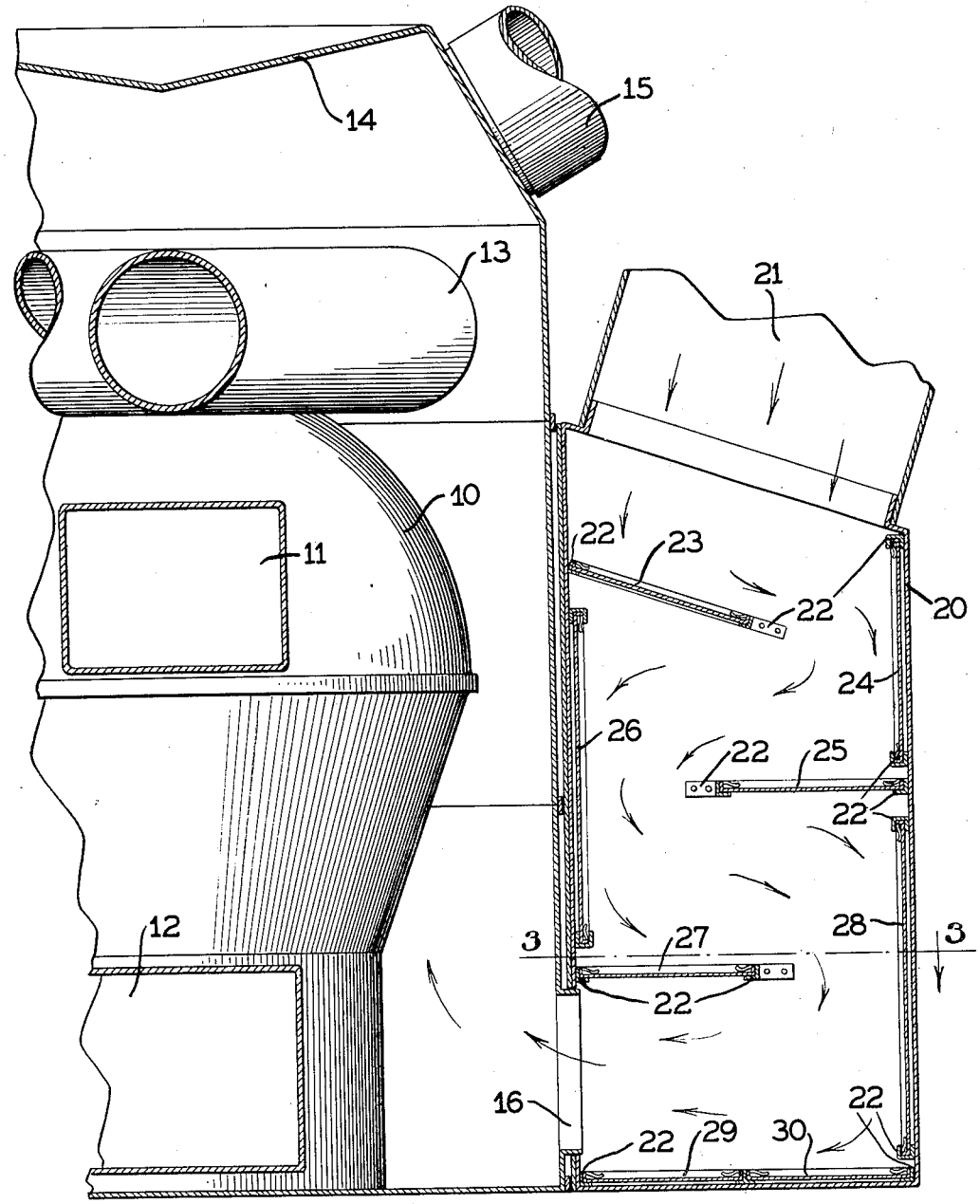
Fig. 1 is an ordinary furnace installation equipped with my novel collecting and purifying chamber, this view being taken in cross section in order to clearly illustrate the path of the air through the cleaning unit.

Referring to Figs. 1 and 3, 10 designates an ordinary furnace, having a fuel opening 11, an ash opening 12, and a radiator 13. A casing 14 surrounds the furnace 10 in the usual manner and is provided with an upper air outlet 15 and an air inlet 16, the latter providing means to which my novel purifying and dust removing chamber is attached.

As clearly shown in Fig. 1, this latter chamber consists of a rectangular shaped casing or housing 20 having an upper air inlet 21 and having an opening 16 leading into the said casing 14.

Figure 2:
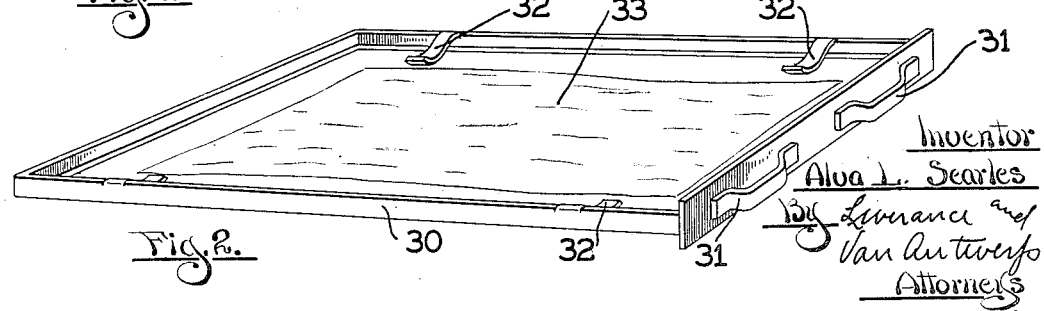
Fig. 2 is a perspective view of one of the removable trays, this view also showing a piece of the adhesive paper in place.

Guide members 22 extend across the interior of the casing 20 and serve to slidably support the several trays 23 to 30 inclusive. These trays are similar in construction except that they are made of different dimensions for obvious reasons and hence only one of them will be described in detail. Referring now to Fig. 2, 30 designates the tray, 31 the handle therefor and 32 the inwardly extending frame clip. These frame clips removably hold the adhesive paper 33 in place. The tray or drawer may be slid into the purifying chamber 20, thus forming baffles as clearly shown in Fig. 1. These baffles are in the path of the air stream and the air impinges against them and swirls about them and any dirt or dust which is in the air contacts with and remains upon the several adhesive sheets.

Referring now to Figs. 4 and 5, these figures illustrating a modified form of my invention, 40 designates the sheet metal casing having an inlet duct 41, an outlet pipe or duct 42, and swinging doors 43, 44 and 45. These doors are adapted to swing outwardly as illustrated by the dotted line showing of Fig. 4. Trays or supporting plates 46, 47 and 48 extend across the interior of the casing 40 and receive sheets of adhesive thereon. Each of the doors 43, 44 and 45 have spring clips 49 on their inner side whereby sheets of adhesive may be affixed thereto.

Fig. 5 clearly illustrates the detailed construction of the spring clip.

From the above description it will be appreciated that I have inventively created a purifying and dust removing chamber which will operate very efficiently under a minimum of air pressure and which may be maintained at such a high efficiency very easily. That is, as soon as any of the adhesive sheets become filled with dirt or dust, they may be removed and new ones inserted in their place. The old ones may be thrust into the furnace and utilized as fuel, thus simplifying the problem of their disposal. Moreover, such removal and insertion of the sheets is easily accomplished due to my particular type of construction.

Having thus described my invention, I desire it to be understood that the invention is in nowise limited to the particular illustrative embodiment disclosed, the scope thereof being set forth in the following claims.

I claim:

1. In a heating system having a right angled conduit adapted to carry an air stream therethrough, said air stream being of a temperature below 150° F., the combination of, a door pivotally mounted in the conduit so as to extend across the outer corner of the angle of said conduit when it is closed, said door swinging outwardly, a flexible nonperforate sheet of material on the inner face of the door, a viscous substance spread over one face of the sheet of material, said viscous material having a melting point above 150° F., and means fastened to the inner side of the door, said means being adapted to engage the sheet of material to secure the same in place.

2. A dust collector comprising, a chamber having an air inlet and outlet, a plurality of adhesive sheets of material located within said chamber in substantially horizontal planes, other adhesive sheets of material located within said chamber in substantially vertical planes, all of said adhesive sheets of material coacting to guide an air current passing through said chamber in a devious path and each of said adhesive sheets being located in a position to be impinged by said air current, said sheets having an adhesive substance thereon whose melting point is above normal room temperature.

In testimony whereof I affix my signature.

ALVA L. SEARLES.